United States Patent
Lee et al.

(10) Patent No.: US 8,224,185 B2
(45) Date of Patent: Jul. 17, 2012

(54) USB COMPATIBLE APPARATUS FOR CONNECTING BETWEEN OPTICAL USB DEVICE AND ELECTRICAL USB DEVICE

(75) Inventors: Min Hyuk Lee, Daejeon (KR); Dong Min Im, Boryeong-Si (KR); Hyo Hoon Park, Daejeon (KR); Tae Woo Lee, Daejeon (KR); Mu Hee Cho, Daejeon (KR); Seong Woon Kim, Gyeryong-Si (KR)

(73) Assignee: Kaist, Daejeon (KR)

( * ) Notice: Subject to any disclaimer, the term of this patent is extended or adjusted under 35 U.S.C. 154(b) by 329 days.

(21) Appl. No.: 12/635,036

(22) Filed: Dec. 10, 2009

(65) Prior Publication Data

US 2010/0150572 A1      Jun. 17, 2010

(30) Foreign Application Priority Data

Dec. 11, 2008 (KR) .......... 10-2008-0125859
May 20, 2009 (KR) .......... 10-2009-0043898

(51) Int. Cl.
*H04B 10/14* (2006.01)
(52) U.S. Cl. ............ 398/117; 398/139
(58) Field of Classification Search .......... 398/115, 398/117, 135, 139
See application file for complete search history.

(56) References Cited

U.S. PATENT DOCUMENTS
2009/0196621 A1 * 8/2009 Chen .................. 398/115

FOREIGN PATENT DOCUMENTS
EP          1016885       * 7/2000
* cited by examiner

*Primary Examiner* — Leslie Pascal
(74) *Attorney, Agent, or Firm* — The Webb Law Firm (57) ABSTRACT

A USB compatible apparatus for connecting an optical universal serial bus (USB) (or an optical serial bus; OSB) device and an electrical USB device, and a structure of the apparatus are provided. More particularly, a USB compatible apparatus for guaranteeing a connection between an optical USB device for inputting/outputting an optical signal and an electrical USB device for inputting/outputting an electrical signal, for example, signal transmission and reception between an electrical USB device (e.g., an electrical USB memory) and an optical USB device (e.g., a computer) having an optical USB port, and a structure of the USB compatible apparatus (a first exemplary embodiment), and a USB compatible apparatus for guaranteeing signal transmission and reception between an optical USB device (e.g., an optical USB memory) and an electrical USB device (e.g., a portable telephone) having an electrical USB port, and a structure of the USB compatible apparatus (a second exemplary embodiment) are provided.

15 Claims, 6 Drawing Sheets

<Signal processor>

FIG. 6

<Signal Converter>

USB COMPATIBLE APPARATUS FOR CONNECTING BETWEEN OPTICAL USB DEVICE AND ELECTRICAL USB DEVICE

CROSS-REFERENCE TO RELATED APPLICATION

This application claims priority to and the benefit of Korean Patent Application Nos. 2008-0125859 filed on Dec. 11, 2008 and 2009-0043898 filed on May 20, 2009, the disclosure of which is incorporated herein by reference in its entirety.

BACKGROUND

1. Field of the Invention

The present invention relates to an apparatus for connecting an optical universal serial bus (USB) (or an optical serial bus; OSB) device and an electrical USB device, and a structure of the apparatus. More particularly, the present invention relates to a USB compatible apparatus for guaranteeing a connection between an optical USB device for inputting/outputting an optical signal and an electrical USB device for inputting/outputting an electrical signal, for example, signal transmission and reception between an electrical USB device (e.g., an electrical USB memory) and an optical USB device (e.g., a computer) having an optical USB port, and a structure of the USB compatible apparatus (a first exemplary embodiment), and to a USB compatible apparatus for guaranteeing signal transmission and reception between an optical USB device (e.g., an optical USB memory) and an electrical USB device (e.g., a portable telephone) having an electrical USB port, and a structure of the USB compatible apparatus (a second exemplary embodiment).

For identification of types of external USB devices in this disclosure, an existing USB device, such as a USB device for inputting/outputting an electrical signal, is defined as an "electrical USB device" and a USB device for inputting/outputting an optical signal is defined as an "optical USB device."

For example, an optical signal input/output interface scheme is referred to as an "optical serial bus (OSB)." For easy understanding of related techniques, an OSB is referred to as an "optical USB." Among terms used herein, a male terminal of an interface may be understood as including a plug, and a female terminal may be understood as including a port.

2. Discussion of Related Art

Rapid developments of microprocessor unit (MPU) and memory chip technology have led to a sudden increase of data processing capacity between a computer and a peripheral device. Accordingly, fast signal transmission and highly dense wirings between the computer and the peripheral device are required.

Meanwhile, general-purpose universal serial buses (USBs) are generally used to connect between a computer and a peripheral device.

However, since USBs (with versions 1.0, 1.1, and 2.0) employ an electrical connection scheme (hereinafter, "electrical USB scheme"), there is a limit to which UBSs can keep up with a data processing speed between connected devices. As a result, high-performance MPUs or memory chips do not lead to enhancement of an overall data processing speed.

As an alternative to the electrical USB scheme, an optical USB scheme in which an optical signal is transmitted using optical waveguides has recently been proposed. In the optical USB scheme, for example, optical connections rather than electrical connections are used as buses for connecting between a computer and a peripheral device.

Optical USB schemes for connecting between a computer and a peripheral device include a scheme of using an optical transceiver module and an optical fiber (hereinafter, referred to as "conventional technique 1") and a scheme of using an optical communication interface (hereinafter, referred to as "conventional technique 2").

In conventional technique 1, a USB extension device used when a computer having an electrical USB port is far from a printer having an electrical USB plug is embodied by an optical transceiver module and an optical fiber.

However, in conventional technique 1, an interface for the USB extension device must conform to an existing electrical connection scheme in order to connect external devices employing an electrical connection scheme. Conventional technique 1 does not support a data processing speed of a MPU or a memory chip and cannot be directly used for external devices that use optical waveguides to support the data processing speed of the MPU or the memory chip.

Meanwhile, conventional technique 2 provides a module capable of reducing the number of optical fibers using a signal property of the USB. However, conventional technique 2 has a problem connecting external devices employing an electrical connection scheme and does not support connection of external devices using an optical waveguide either.

Thus, since the electrical USB scheme degrades data transmission efficiency due to generation of electromagnetic waves in transmitting high-speed data of 5 Gbps or more, there is a need for USB conversion technology of an optical connection scheme using an optical line for high-speed data transmission.

Meanwhile, since most existing computers, peripheral devices (e.g., printers, mice, and keyboards), portable memories, consumer electronics, portable telephones, content player devices (MP3 players, portable multimedia players (PMPs), and portable game machines), etc. support only an electrical USB interface, there is a need for technology capable of guaranteeing connection compatibility between an electrical USB device and an optical USB device (i.e., a device having an optical USB interface).

For example, there is a need for technology for allowing an optical USB memory to be connected to an existing computer having an electrical USB port for signal transmission and reception or an existing electrical USB memory to be connected to a computer having an optical USB port for signal transmission and reception.

Specifically, there is a need for technology to develop a USB compatible apparatus that is an adaptor capable of connecting external devices with different USB schemes by properly converting a signal input/output to/from an optical USB device according to an existing electrical USB standard and transmitting a resultant signal, or properly converting a signal input/output to/from an existing electrical USB device according to an optical USB standard and transmitting a resultant signal.

SUMMARY OF THE INVENTION

The present invention is directed to a universal serial bus (USB) compatible apparatus for guaranteeing a connection between an optical USB device for inputting/outputting an optical signal and an electrical USB device for inputting/outputting an electrical signal, for example, signal transmission and reception between an electrical USB device (e.g., an electrical USB memory) and an optical USB device (e.g., a computer) having an optical USB port, and a structure of the USB compatible apparatus (a first exemplary embodiment), and to a USB compatible apparatus for guaranteeing signal transmission and reception between an optical USB device (e.g., an optical USB memory) and an electrical USB device (e.g., a portable telephone) having an electrical USB port, and a structure of the USB compatible apparatus (a second exemplary embodiment).

The aforementioned and other objects and advantages of the present invention will be readily clarified in the description of the preferred embodiments. Also, it can be readily seen that the objects and advantages of the present invention can be realized by units defined in claims and a combination of the units.

According to an aspect of the present invention, there is provided a USB compatible apparatus for connecting between an optical USB device and an electrical USB device, including: a female terminal including an electrical USB port to which a plug of the electrical USB device is detachably connected; a signal processor for processing an optical signal received from the optical USB device to obtain a signal conforming to a signal system of an electrical USB standard, and processing an electrical signal received from the electrical USB device to obtain a signal conforming to a signal system of an optical USB standard; a signal converter for converting the optical signal received from the optical USB device into an electrical signal and the electrical signal received from the electrical USB device into an optical signal; and a male terminal detachably connected to an optical USB port of the optical USB device, and including optical waveguides and guide pins.

The male terminal may include guide pins inserted into guide holes of the optical USB port of the optical USB device; a connection member fastened to a connection member of the optical USB port of the optical USB device; and the optical waveguides connected to optical waveguides of the optical USB port of the optical USB device.

According to another aspect of the present invention, there is provided a USB compatible apparatus for connecting between an optical USB device and an electrical USB device, including: a female terminal including optical waveguides and guide holes to which a plug of the optical USB device is detachably connected; a signal converter for converting an electrical signal received from the electrical USB device into an optical signal and an optical signal received from the optical USB device into an electrical signal; a signal processor for processing the electrical signal received from the electrical USB device to obtain a signal conforming to a signal system of an optical USB standard, and processing the optical signal received from the optical USB device to obtain a signal conforming to a signal system of an electrical USB standard; and a male terminal detachably connected to an electrical USB port of the electrical USB device, and including a plug.

The female terminal may include guide holes into which guide pins of the optical USB device are inserted; a connection member fastened to a connection member of the optical USB device; and the optical waveguides connected to optical waveguides of the optical USB device.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The present invention proposes a USB compatible apparatus for guaranteeing a connection between different types of external USB-based devices (e.g., an optical USB device for inputting/outputting an optical signal and an electrical USB device for inputting/outputting an electrical signal), and a structure of the USB compatible apparatus.

A first exemplary embodiment of the present invention proposes a USB compatible apparatus for guaranteeing signal transmission and reception between an electrical USB device (e.g., an electrical USB memory) and an optical USB device (e.g., a computer) having an optical USB port, and a structure of the USB compatible apparatus.

A second exemplary embodiment of the present invention proposes a USB compatible apparatus for guaranteeing signal transmission and reception between an optical USB device (e.g., an optical USB memory) and an electrical USB device (e.g., a portable telephone) having an electrical USB port, and a structure of the USB compatible apparatus.

Meanwhile, exemplary embodiments of the present invention may be applied to various external devices, such as computers, peripheral devices (e.g., printers, mice and keyboards), portable memories, consumer electronics, portable telephones, content player devices (MP3 players, portable multimedia players (PMPs), and portable game machines), etc. having an electrical USB interface (e.g., an electrical USB port or an electrical USB plug); and computers, peripheral devices (e.g., printers, mice, and keyboards), portable memories, consumer electronics, content player devices (MP3 players, PMPs, portable game machines), etc. having an optical USB interface (e.g., an optical USB port or an optical USB plug), and are not limited to specific products.

Various exemplary embodiments will now be described more fully with reference to the accompanying drawings in which some exemplary embodiments are shown.

Figure 1:
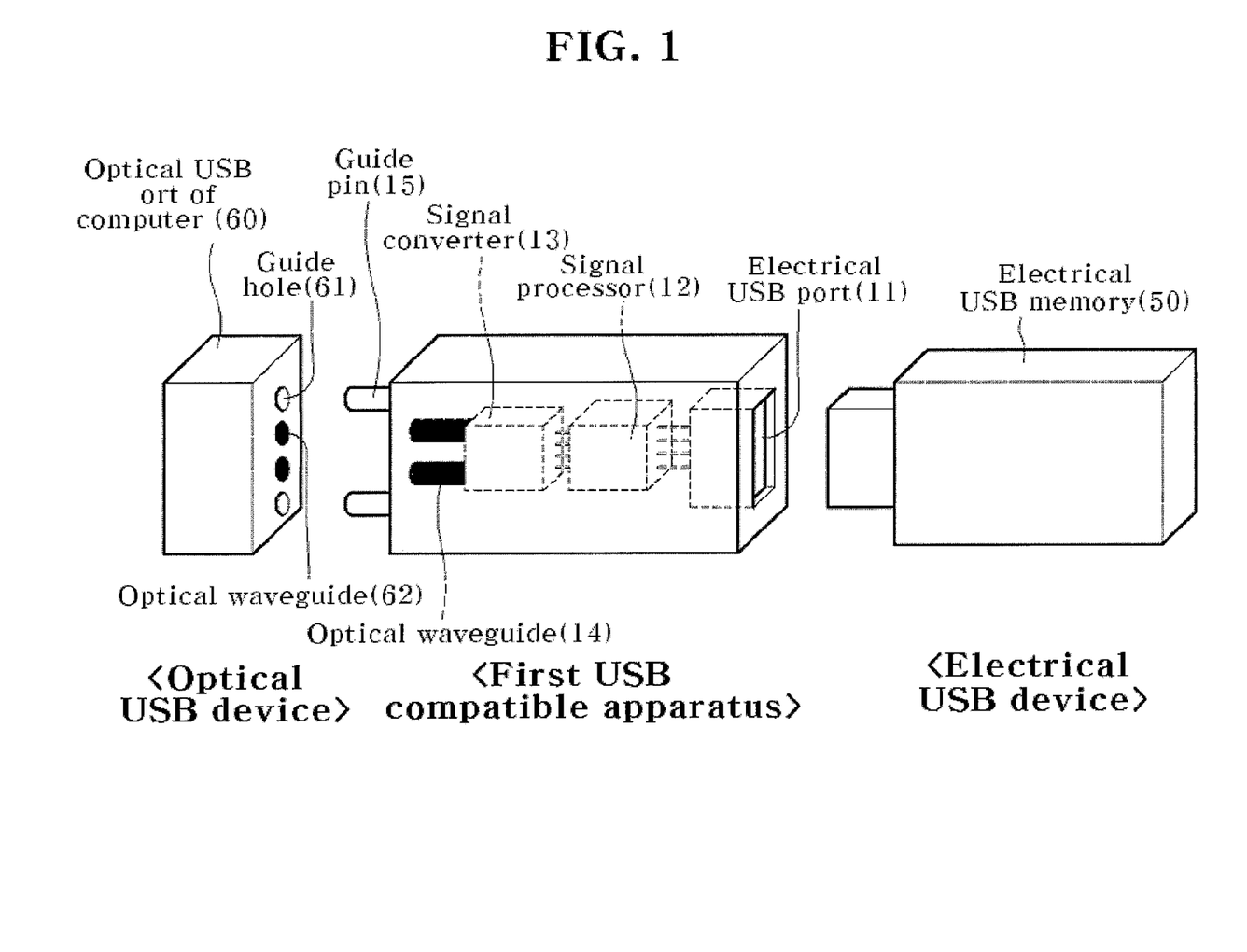
FIG. 1 illustrates a configuration of a USB compatible apparatus for connecting between a port of an electrical USB device and a port of an optical USB device according to a first exemplary embodiment of the present invention.

FIG. 1 illustrates a configuration of a USB compatible apparatus for connecting between a port of an electrical USB device and a port of an optical USB device according to a first exemplary embodiment of the present invention.

For easy understanding of the first exemplary embodiment of the present invention, it is assumed that the electrical USB device is an electrical USB memory and the optical USB device is a computer including an optical USB port (hereinafter, referred to as a "computer"). A rear configuration of the optical USB port of the computer is not shown in FIG. 1.

The USB compatible apparatus according to the first exemplary embodiment of the present invention (hereinafter, referred to as "first USB compatible apparatus") includes a female terminal having an electrical USB port 11, a signal processor 12, a signal converter 13, optical waveguides 14, and a male terminal having guide pins 15.

Meanwhile, in FIG. 1, a reference numeral "50" indicates the electrical USB memory, a reference numeral "60" indicates the optical USB port of the computer, a reference numeral "61" indicates guide holes of the optical USB port 60 of the computer, and a reference numeral "62" indicates optical waveguides of the optical USB port 60 of the computer.

As shown in FIG. 1, the first USB compatible apparatus includes the electrical USB port 11 that is a component of the female terminal for detachable connection of the electrical USB memory 50, and the guide pins 15 that are components of the male terminal for detachable connection of the optical USB port 60 of the computer. Here, the male terminal of the first USB compatible apparatus will be described below with reference to FIG. 3.

Figure 2:
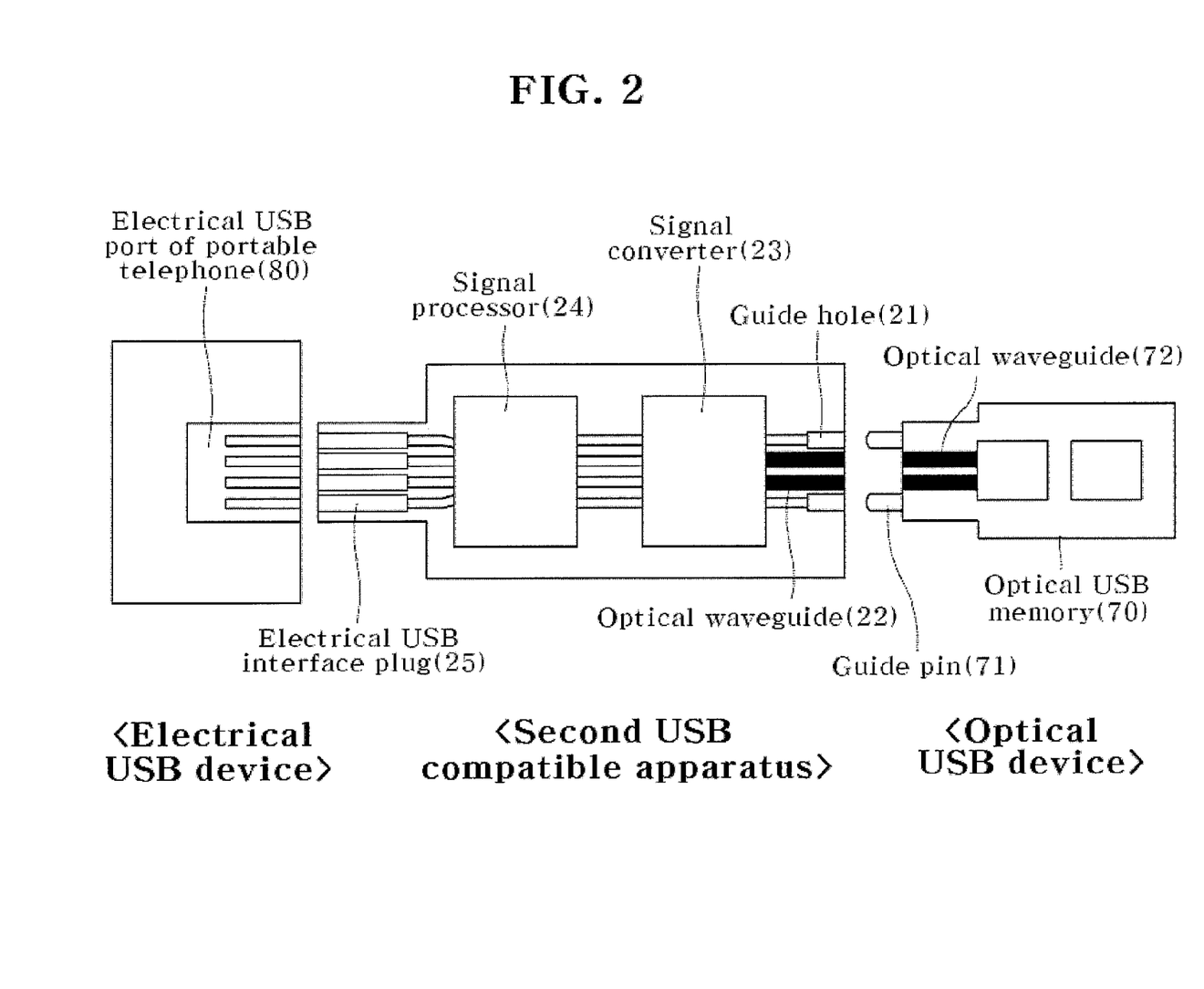
FIG. 2 illustrates a configuration of a USB compatible apparatus for connecting between a port of an optical USB device and a port of an electrical USB device according to a second exemplary embodiment of the present invention.

FIG. 2 illustrates a configuration of a USB compatible apparatus for connecting between a port of an optical USB device and a port of an electrical USB device according to a second exemplary embodiment of the present invention.

For easy understanding of the second exemplary embodiment of the present invention, it is assumed that the optical USB device is an optical USB memory and the electrical USB device is a portable telephone including an electrical USB port (hereinafter, referred to as a "portable telephone"). A rear configuration of the electrical USB port of the portable telephone is not shown in FIG. 2.

The USB compatible apparatus according to the second exemplary embodiment of the present invention (hereinafter, referred to as "second USB compatible apparatus") includes a female terminal including guide holes 21 and optical waveguides 22, a signal converter 23, a signal processor 24, and a male terminal including an electrical USB plug 25.

Meanwhile, in FIG. 2, a reference numeral "70" indicates the optical USB memory, a reference numeral "71" indicates guide pins of the optical USB memory 70, a reference numeral "72" indicates optical waveguides of the optical USB memory 70, and a reference numeral "80" indicates the electrical USB port of the portable telephone.

As shown in FIG. 2, the second USB compatible apparatus includes guide holes 21 that are components of a female terminal for detachable connection of the optical USB memory 70, and an electrical USB plug 25 that is a component of a male terminal for detachable connection of the electrical USB port 80 of the portable telephone. Here, the female terminal of the second USB compatible apparatus will be described below with reference to FIG. 4.

As shown in FIGS. 1 and 2, the USB compatible apparatuses according to the present invention include one female terminal and one male terminal for connection with respective external USB devices. Here, one of the terminals (the female terminal or the male terminal) is designed to input/output an electrical signal, and the other terminal (the male terminal or the female terminal) is designed to input/output an optical signal.

That is, the first USB compatible apparatus in FIG. 1 is designed so that the male terminal can conform to an optical USB interface standard and the female terminal can conform to an electrical USB interface standard, and the second USB compatible apparatus in FIG. 2 is designed so that the male terminal can conform to the electrical USB interface standard and the female terminal can conform to the optical USB interface standard. This will be described in detail with reference to FIGS. 3 and 4.

Figure 3:
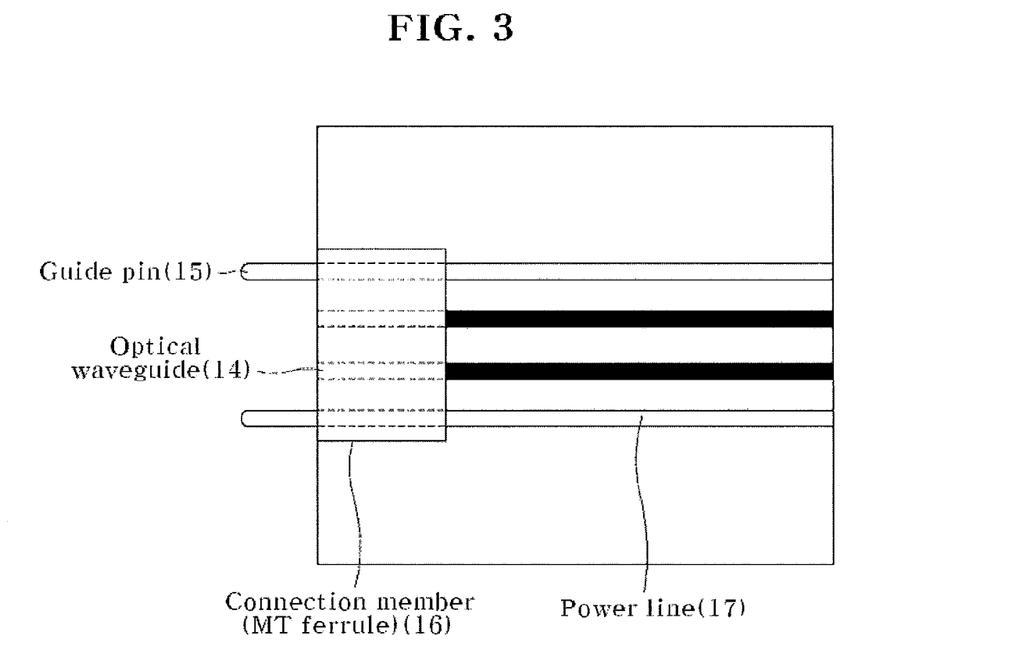
FIG. 3 illustrates a structure of a male terminal of the USB compatible apparatus according to the first exemplary embodiment of the present invention.

FIG. 3 illustrates a structure of the male terminal of the USB compatible apparatus according to the first exemplary embodiment of the present invention.

Referring to FIG. 3, the male terminal of the first USB compatible apparatus includes optical waveguides 14, guide pins 15, a connection member (e.g., an MT Ferrule; 16), and power lines 17.

For example, when the first USB compatible apparatus is connected to the optical USB port 60 of the computer, the guide pins 15 of the first USB compatible apparatus are inserted into the guide holes 61 of the optical USB port 60 of the computer and the connection member 16 of the first USB compatible apparatus is fastened to the connection member of the optical USB port 60 of the computer, such that the optical waveguides 14 of the first USB compatible apparatus are closely adhered and fixed to the optical waveguides 62 of the optical USB port 60 of the computer.

As the first USB compatible apparatus is fixed to the computer, the guide pins 15 are connected to the power lines 17 to perform a function of supplying power provided from the computer via the optical USB port 60, to the first USB compatible apparatus and the electrical USB memory 50 via the power lines 17 (including a ground function).

Meanwhile, in the first exemplary embodiment of the present invention, when the first USB compatible apparatus is connected with the electrical USB memory, the plug of the electrical USB memory 50 is inserted into the electrical USB port 11 of the first USB compatible apparatus.

Figure 4:
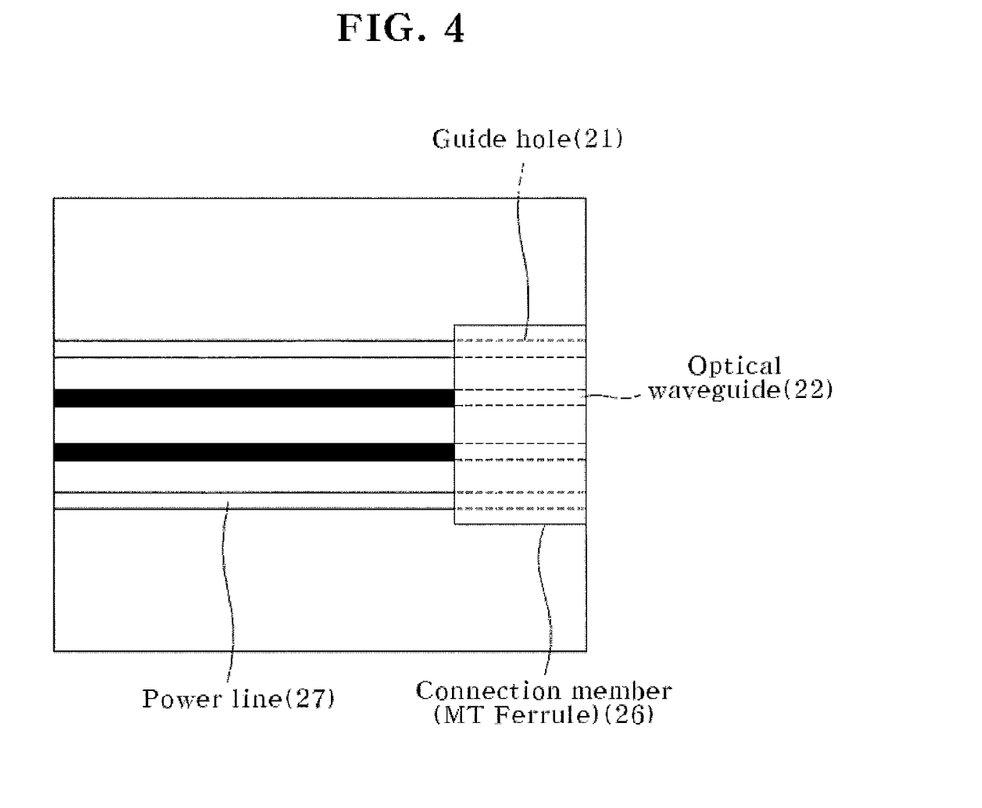
FIG. 4 illustrates a structure of a female terminal of the USB compatible apparatus according to the second exemplary embodiment of the present invention.

FIG. 4 illustrates a structure of the female terminal of the USB compatible apparatus according to the second exemplary embodiment of the present invention.

Referring to FIG. 4, the female terminal of the second USB compatible apparatus includes guide holes 21, optical waveguides 22, a connection member (e.g., an MT Ferrule; 26), and power lines 27.

For example, when the second USB compatible apparatus is connected with the optical USB memory 70, the guide pins 71 of the optical USB memory 70 are inserted into the guide holes 21 of the second USB compatible apparatus, and the connection member 26 of the second USB compatible apparatus is fastened to the connection member of the optical USB memory 70, such that the optical waveguides 22 of the second USB compatible apparatus are closely adhered and fixed to the optical waveguides 72 of the optical USB memory 70.

As the second USB compatible apparatus is fixed to the optical USB memory 70, the guide holes 21 are connected to the power lines 27 for supplying power provided from the portable telephone via the electrical USB port 80 of the portable telephone, to the second USB compatible apparatus and the optical USB memory 70 via the power lines 27 (including a ground function).

Meanwhile, in the second exemplary embodiment of the present invention, when the second USB compatible apparatus is connected with the electrical USB port 80 of the portable telephone, the electrical USB plug 25 of the second USB compatible apparatus is inserted into the electrical USB port 80 of the portable telephone.

The signal processors of the first and second USB compatible apparatuses will now be described with reference to FIG. 5. In this case, the signal processors of the first USB compatible apparatus will be described by way of example. Common operations/functions of the first and second USB compatible apparatuses will be described and different operations/functions will be described separately.

Figure 5:
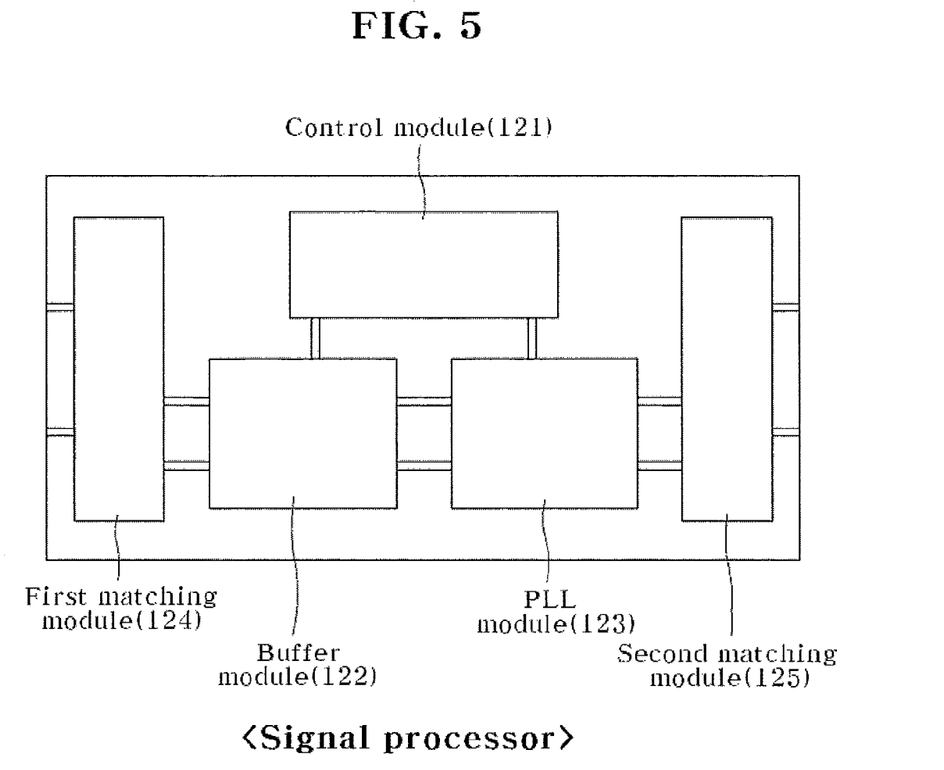
FIG. 5 illustrates a configuration of a signal processor of the USB compatible apparatus according to an exemplary embodiment of the present invention.

FIG. 5 illustrates a configuration of a signal processor of the USB compatible apparatus according to an exemplary embodiment of the present invention.

The signal processor of the USB compatible apparatus according to an exemplary embodiment of the present invention includes a control module 121, a buffer module 122, a phase-locked loop (PLL) module 123, a first matching module (or a first matching circuit) 124, and a second matching module (or a second matching circuit) 125.

The signal processor of the USB compatible apparatus performs a function of suitably processing a signal received from the external USB device or the signal converter 13, i.e., a high-speed signal conforming to a signal system of an optical USB standard to obtain a signal conforming to a signal system of an electrical USB standard, or suitably processing a signal conforming to the signal system of the electrical USB standard to obtain a high-speed signal conforming to the signal system of the optical USB standard.

As shown in FIG. 5, the buffer module 122 and the PLL module 123 in the signal processor perform a function of eliminating latency resulting from a speed difference between a high-speed signal obtained through conversion of the optical signal received from the optical USB device and a signal received from the electrical USB device, under control of the control module 121.

The first and second matching modules 124 and 125 are matching circuits provided for matching speeds of the optical signal and the electrical signal, i.e., the speeds of the two different signals.

For example, the first matching module 124 is disposed in the signal processor 12 toward the signal converter 13, for matching impedance between a signal received from the signal converter 13 and a signal transmitted from the signal processor 12 to the signal converter 13. This is intended to reduce signal loss by matching impedance between the two signals at different speeds.

The second matching module 125 is disposed in the signal processor 12 toward the electrical USB port 11, for matching impedance between a signal received from the electrical USB port 11 and a signal transmitted from the signal processor 12 to the electrical USB port 11. This is intended to reduce signal loss by matching impedance between the two signals at different speeds.

The signal converters of the first and second USB compatible apparatuses will now be described with reference to FIG. 6. Here, the signal converter of the first USB compatible apparatus will be described by way of example. Common operations/functions of the first and second USB compatible apparatuses will be described and different operations/functions will be described separately.

Figure 6:
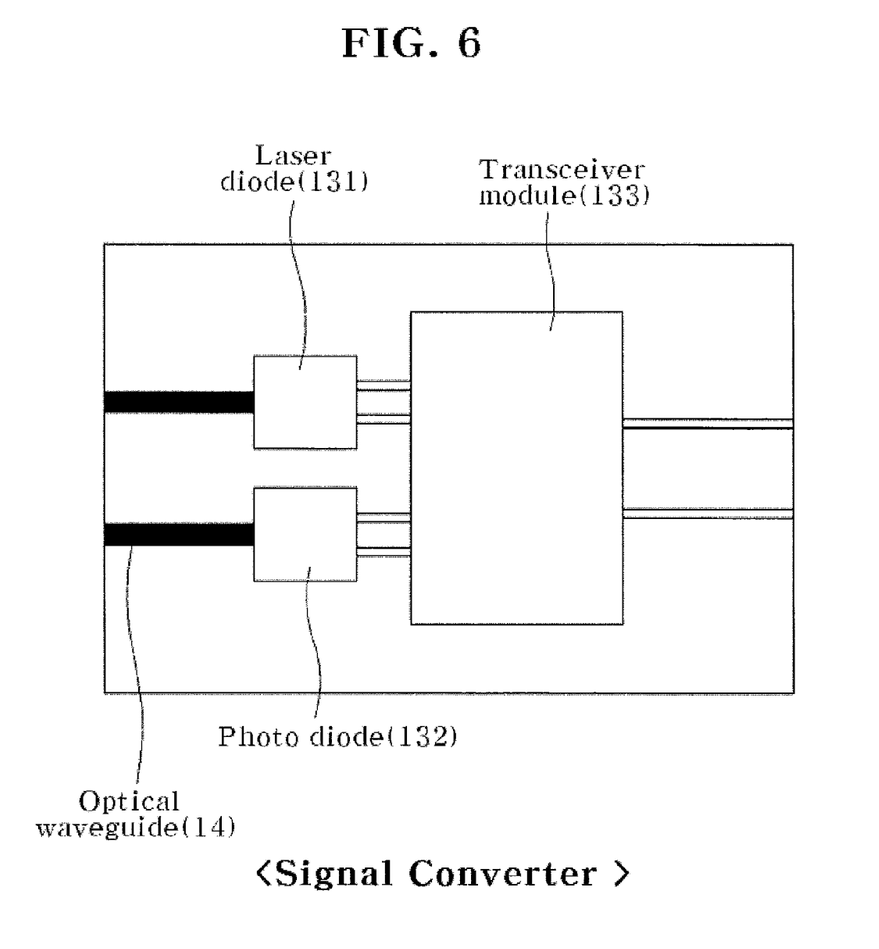
FIG. 6 illustrates a configuration of a signal converter of a USB compatible apparatus according to an exemplary embodiment of the present invention.

FIG. 6 illustrates a configuration of the signal converter of the USB compatible apparatus according to an exemplary embodiment of the present invention.

The signal converter of the USB compatible apparatus according to an exemplary embodiment of the present invention includes a laser diode (LD) 131, a photo diode (PD) 132, and a transceiver module 133. A reference numeral "14" indicates an optical waveguide.

The signal converter is connected to the external optical USB device via the optical waveguides 14, and performs a function of converting an optical signal received from the external optical USB device to an electrical signal or an electrical signal received from an external electrical USB device into an optical signal.

The signal converter performs both an opto-electrical (O/E) conversion function and an electro-optical (E/O) conversion function and can perform bidirectional transmission.

That is, the laser diode 131 converts an input electrical signal into an optical signal and outputs the optical signal, the photo diode 132 converts an input optical signal into an electrical signal and outputs the electrical signal, and the transceiver module 133 transmits the signal from the laser diode 131 or the photo diode 132 to an external USB device or delivers a signal from the external USB device to the laser diode 131 or the photo diode 132.

As described above, in the first and second USB compatible apparatuses of the present invention, the optical signal received from the external optical USB device is subjected to an opto-electrical (O/E) conversion process and then a signal processing process, and the electrical signal received from the external electrical USB device is subjected to the signal processing process and then the electro-optical (E/O) conversion process.

Meanwhile, the signal processors, the signal converters, and the optical waveguides of the first and second USB compatible apparatuses of the present invention may be embodied to be connected on a printed circuit board (PCB). Also, the signal processors and the signal converters may be embodied as chips with predetermined functions of a driver and a controller and on the PCB.

In particular, the optical waveguide may be made of an optical fiber or a polymer optical waveguide film and embedded in or stacked on the PCB. Alternatively, the optical waveguide may be a polymer guide or wave-guide stacked on a PCB. However, the optical waveguide may be an optical fiber not stacked on a PCB.

The present invention allows for data transmission and reception between an existing electrical USB device and an optical USB device by connecting between ports of the USB devices, and can guarantee compatibility between different types of external USB-based devices.

The present invention can also guarantee a data processing and transmission speed between external devices including a high-performance MPU or memory chip.

The present invention also allows a user to use different types of external USB-based devices as is by purchasing the USB compatible apparatus without adding or changing software/hardware of an electrical USB device or an optical USB device that was previously purchased.

Furthermore, the present invention can increase signal transmission efficiency between different types of external USB-based devices by applying the optical waveguide structure to the USB compatible apparatus.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A USB compatible apparatus for connecting between an optical USB device and an electrical USB device, comprising:

a female terminal including an electrical USB port to which a plug of the electrical USB device is detachably connected;

a signal processor for processing an optical signal received from the optical USB device to obtain a signal conforming to a signal system of an electrical USB standard, and processing an electrical signal received from the electrical USB device to obtain a signal conforming to a signal system of an optical USB standard;

a signal converter for converting the optical signal received from the optical USB device into an electrical signal and the electrical signal received from the electrical USB device into an optical signal; and a male terminal detachably connected to an optical USB port of the optical USB device, and including optical waveguides and guide pins, wherein the signal processor comprises:

a buffer module and a PLL module for eliminating latency resulting from a speed difference between a high-speed signal obtained through conversion of the optical signal received from the optical USB device and the signal received from the electrical USB device; and a matching module for matching impedance between the optical signal and the electrical signal at different speeds.

2. The apparatus of claim 1, wherein the male terminal comprises:

guide pins inserted into guide holes of the optical USB port of the optical USB device;

a connection member fastened to a connection member of the optical USB port of the optical USB device; and the optical waveguides connected to optical waveguides of the optical USB port of the optical USB device.

3. The apparatus of claim 2, wherein the guide pins are connected to internal power lines and supply power provided via the optical USB port of the optical USB device to the electrical USB device.

4. The apparatus of claim 2, wherein the signal converter comprises:

a laser diode for converting an electrical signal received from the electrical USB device via a transceiver module into an optical signal and outputting the optical signal;

a photo diode for converting an optical signal received from the optical USB device via the transceiver module into an electrical signal and outputting the electrical signal; and the transceiver module for transmitting the optical signal from the laser diode to the optical USB device and the electrical signal from the photo diode to the electrical USB device.

5. The apparatus of claim 4, wherein the signal converter is connected with the external optical USB device via the optical waveguides.

6. The apparatus of claim 1, wherein the optical waveguides are embodied to be connected to the signal converter on a printed circuit board (PCB).

7. A USB compatible apparatus for connecting between an optical USB device and an electrical USB device, comprising:

a female terminal including optical waveguides and guide holes to which a plug of the optical USB device is detachably connected;

a signal converter for converting an electrical signal received from the electrical USB device into an optical signal and an optical signal received from the optical USB device into an electrical signal;

a signal processor for processing the electrical signal received from the electrical USB device to obtain a signal conforming to a signal system of an optical USB standard, and processing the optical signal received from the optical USB device to obtain a signal conforming to a signal system of an electrical USB standard; and a male terminal detachably connected to an electrical USB port of the electrical USB device, and including a plug, wherein the signal processor comprises:

a buffer module and a PLL module for eliminating latency resulting from a speed difference between a high-speed signal obtained through conversion of the optical signal received from the optical USB device and the signal received from the electrical USB device; and a matching module for matching impedance between the optical signal and the electrical signal at different speeds.

8. The apparatus of claim 7, wherein the female terminal comprises:

guide holes into which guide pins of the optical USB device are inserted;

a connection member fastened to a connection member of the optical USB device; and the optical waveguides connected to optical waveguides of the optical USB device.

9. The apparatus of claim 8, wherein the guide holes are connected to internal power lines and supply power provided via the electrical USB port of the electrical USB device to the optical USB device.

10. The apparatus of claim 8, wherein the signal converter comprises:

a laser diode for converting an electrical signal received from the electrical USB device via a transceiver module into an optical signal and outputting the optical signal;

a photo diode for converting an optical signal received from the optical USB device via the transceiver module into an electrical signal and outputting the electrical signal; and the transceiver module for transmitting the optical signal from the laser diode to the optical USB device and the electrical signal from the photo diode to the electrical USB device.

11. The apparatus of claim 10, wherein the signal converter is connected with the external optical USB device via the optical waveguides.

12. The apparatus of claim 7, wherein the optical waveguides are embodied to be connected to the signal converter on a printed circuit board (PCB).

13. The apparatus of claim 12, wherein the optical waveguides are embedded in or stacked on the PCB.

14. The apparatus of claim 13, wherein the optical waveguide is a polymer guide or a waveguide stacked on the PCB.

15. The apparatus of claim 13, wherein the optical waveguide is an optical fiber that is not stacked on the PCB.

* * * * *